United States Patent
Agarwal et al.

(10) Patent No.: US 9,557,868 B2
(45) Date of Patent: Jan. 31, 2017

(54) NOISE REDUCTION FOR TOUCH SENSOR SYSTEM WITH ACTIVE STYLUS

(71) Applicant: Apple Inc., Cupertino, CA (US)

(72) Inventors: Manu Agarwal, Palo Alto, CA (US); Shahrooz Shahparnia, Campbell, CA (US); Vivek Pant, San Jose, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 14/550,784

(22) Filed: Nov. 21, 2014

(65) Prior Publication Data

US 2016/0147319 A1    May 26, 2016

(51) Int. Cl.
*G06F 3/041* (2006.01)
*G06F 3/045* (2006.01)
*G06F 3/044* (2006.01)

(52) U.S. Cl.
CPC ............. *G06F 3/044* (2013.01); *G06F 3/0418* (2013.01); *G06F 2203/04107* (2013.01)

(58) Field of Classification Search
CPC .... G06F 3/033; G06F 3/03545; G06F 3/0418; G06F 3/044; G06F 3/0416
USPC ................. 345/173, 174; 178/18.03
See application file for complete search history.

(56) References Cited

U.S. PATENT DOCUMENTS

| | | | |
|---|---|---|---|
| 8,294,687 B1 | 10/2012 | Ksondzyk | |
| 8,536,880 B2 | 9/2013 | Philipp | |
| 8,928,635 B2 | 1/2015 | Harley et al. | |
| 2008/0042985 A1* | 2/2008 | Katsuhito | G06F 3/044 345/173 |
| 2009/0127003 A1* | 5/2009 | Geaghan | G06F 3/044 178/18.03 |
| 2011/0181550 A1* | 7/2011 | Hotelling | G06F 3/0416 345/174 |
| 2011/0267296 A1* | 11/2011 | Noguchi | G06F 3/0412 345/173 |
| 2012/0182252 A1 | 7/2012 | Brosnan et al. | |
| 2013/0176275 A1 | 7/2013 | Weaver et al. | |
| 2014/0071082 A1* | 3/2014 | Singh | G06F 3/044 345/174 |
| 2014/0152582 A1 | 6/2014 | Agarwal et al. | |
| 2014/0267129 A1* | 9/2014 | Rebeschi | H03K 17/9622 345/174 |

* cited by examiner

*Primary Examiner* — Andrew Sasinowski
*Assistant Examiner* — Kuo Woo
(74) *Attorney, Agent, or Firm* — Treyz Law Group, P.C.; G. Victor Treyz; Joseph F. Guihan

(57) ABSTRACT

A touch sensor may overlap a display. A transparent shield layer that is grounded around its edges may be interposed between the display and the touch sensor to help prevent noise from display data lines from reaching the touch sensor. The data lines may extend along a first dimension. The touch sensor may have first elongated electrodes that extend along the first dimension and second elongated electrodes that extend along a second dimension that is perpendicular to the first dimension. The second electrodes may be interposed between the first electrodes and the data lines. Pen present electrodes may be used to gather pen present data associated with a stylus on the touch sensor. Adjacent noise sensors may collect noise data that is removed from the pen present data.

22 Claims, 15 Drawing Sheets

| NOISE SAMPLE CONFIGURATION | SCALING FACTOR K |
|---|---|
| 2/2 | 1 |
| 1/3 | 0.75 |
| 0/4 | 0.6 |

*FIG. 14*

NOISE REDUCTION FOR TOUCH SENSOR SYSTEM WITH ACTIVE STYLUS

BACKGROUND

This relates generally to touch sensors and, more particularly, to reducing noise in touch sensors.

Electronic devices such as tablet computers and cellular telephones often include capacitive touch sensors. A capacitive touch sensor has an array of electrodes that can be used to measure the position of a user's finger or an external device such as a touch sensor stylus. In an active stylus design, circuitry in a stylus emits signals that are detected by the touch sensor electrodes. The use of active stylus designs can help improve stylus performance.

There are challenges associated with using capacitive touch sensors to gather stylus input. Touch sensors are often mounted over displays to form touch sensitive displays. Displays have signal lines such as data lines that can emit noise. The noise can interfere with the operation of the touch sensor and can make it difficult to obtain accurate position information for a stylus. Unless care is taken, stylus data may be inaccurate or may require overly complex signal processing operations.

It would therefore be desirable to be able to provide an improved touch sensor system for an electronic device.

SUMMARY

An electronic device may have a display. The display may have an array of pixels to produce images for a user. Data lines in the display may distribute data to the pixels. A touch sensor may overlap the display.

The data lines and other signal lines in the display have a potential to produce electrical noise that can be coupled into the touch sensor. A transparent shield layer may be interposed between the display and the touch sensor to help suppress this noise. The shield may be grounded along the edges of the touch sensor.

The data lines may extend along a first dimension. The touch sensor may have first elongated electrodes that extend along the first dimension and second elongated electrodes that extend along a second dimension that is perpendicular to the first dimension. The second electrodes may be interposed between the first electrodes and the data lines.

In the presence of a stylus at a location on the surface of the touch sensor, some of the touch sensor electrodes will pick up signals from the stylus. These pen present electrodes may be used to gather pen present data associated with the stylus. Noise from the display may be assessed by making noise data measurements using noise electrodes that are adjacent to the pen present electrodes.

During operation, touch sensor circuitry may identify the pen present electrodes and gather pen present data. Adjacent noise electrodes to the left and right of the pen present electrodes may be used to measure noise data. The noise data can be averaged to assess how much noise is present on the pen present electrodes, so that corrective processing may be performed. The amount of noise on the noise electrodes can be affected by the distance from the grounded edges of the shield and therefore the edges of the touch sensor. To ensure that pen present data is processed accurately, the averaged noise data can be scaled based on how far the pen present electrodes are from the edge of the touch sensor. In the center of the sensor, no scaling is needed. At the edge of the display, the pattern of noise electrodes that are used in gathering noise data may be reconfigured and scaling operations may be used to take account of the noise electrode configuration and position dependence of the noise.

The scaled noise data can be removed from the pen present data to produce noise-removed (corrected) pen present data. This data may be processed to produce information on the current location of the stylus on the surface of the touch sensor.

BRIEF DESCRIPTION OF THE DRAWINGS

FIG. 14 is an illustrative look-up table that may be used to store scaling factor information for a noise correction module in accordance with an embodiment.

DETAILED DESCRIPTION

Figure 1:
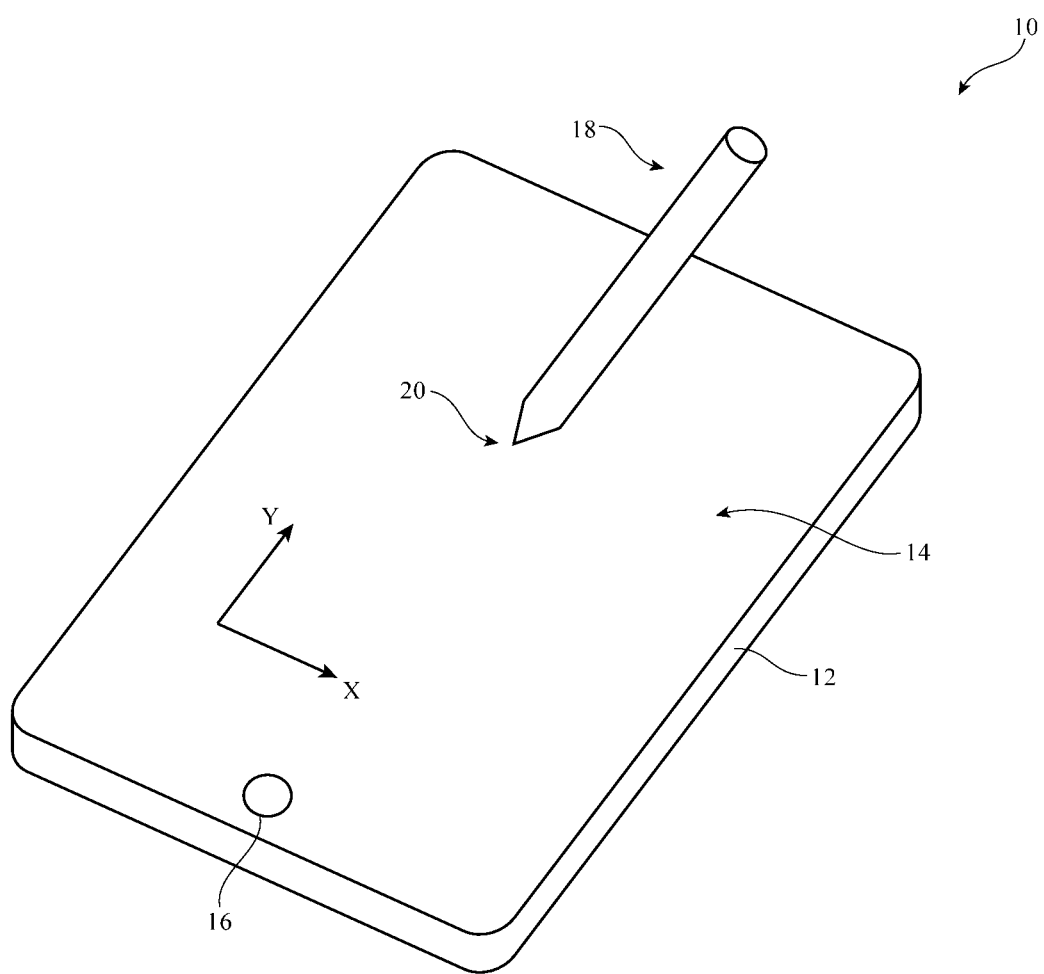
FIG. 1 is a front perspective view of an illustrative electronic device with a touch sensitive display and an associated stylus for providing touch input in accordance with an embodiment.

An electronic device such as electronic device 10 of FIG. 1 may be provided with a touch sensor. The touch sensor may be integrated with a display to form a touch screen display or may be incorporated into a component without a display such as a touch pad. Configurations in which the touch sensor forms part of a display are sometimes described herein as an example. A stylus such as stylus 18 may be used to provide touch input to the touch sensor.

Electronic device 10 may be computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components. Capacitive touch screen electrodes may be formed from an array of indium tin oxide pads or other transparent conductive structures. The use of transparent structures in forming the electrodes for the touch sensor of display 14 allows light from an array of pixels within display 14 to be used to display images for a user. The touch sensor may, as an example, be mounted on the outside of display 14 (e.g., on the underside of a display cover layer or other protective layer). During operation, the light from display 14 may pass through the touch sensor for viewing by a user.

Display 14 may include an array of pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker ports. Openings may be formed in housing 12 to form communications ports (e.g., an audio jack port, a digital data port, etc.), to form openings for buttons, to form media card slots, etc. For example, an opening may be formed at the end of housing 12 to accommodate a data port.

During operation, a user of device 10 may supply input to device 10 using stylus 18. Stylus 18, which may sometimes be referred to as a computer stylus or pen, may have a tip such as tip 20. Circuitry within stylus 18 may be used to emit electrical signals that are detected by the capacitive touch sensor electrodes of the touch sensor of device 10 (e.g., the touch sensor of touch screen display 14). Device 10 may contain touch sensor circuitry that detects and processes the emitted electromagnetic signals to determine the position of stylus 18 (i.e., to determine the position of tip 20 on display 14 relative to lateral dimensions X and Y).

Figure 2:
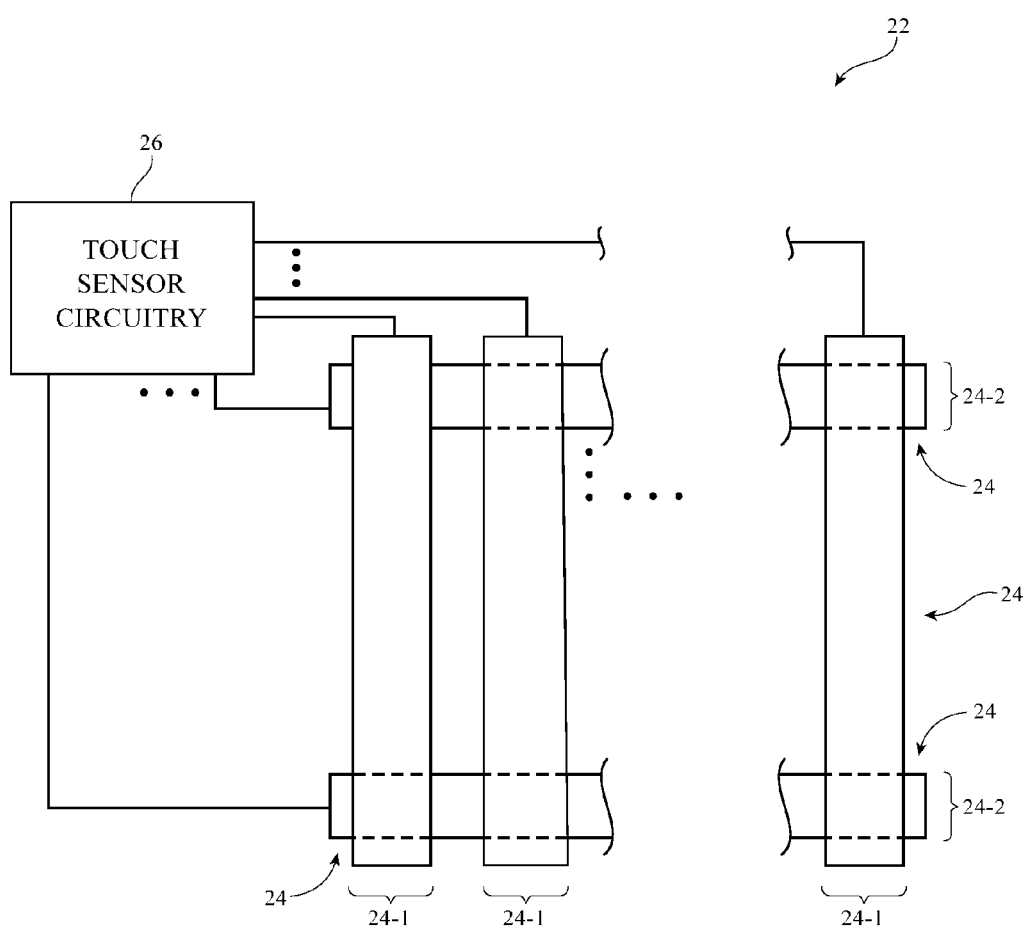
FIG. 2 is a top view of an illustrative touch sensor in accordance with an embodiment.

FIG. 2 is a top view of an illustrative capacitive touch sensor. As shown in FIG. 2, touch sensor 22 may have electrodes 24. Electrodes 24 may be formed from metal, transparent conductive materials such as indium tin oxide, or other conductive material. When mounting touch sensor 22 of FIG. 2 over the front of a display, electrodes 24 are preferably formed from a transparent conductive material such as indium tin oxide.

Electrodes 24 may have any suitable shape and layout. For example, electrodes 24 may be formed from horizontal conductive strips 24-2 and vertical conductive strips 24-1 (i.e., elongated electrodes 24-1 and 24-2 may run perpendicular to each other). There may be multiple rows of strips 24-2 and multiple rows of strips 24-1 in sensor 22. Touch sensors with larger numbers of rows and columns of electrodes 24 exhibit greater spatial resolution than touch sensors with fewer electrodes, but can be more complex and costly than simpler touch sensors. Touch sensor circuitry 26 may be coupled to electrodes 24-1 and 24-2 (e.g., to supply drive signals to electrodes 24-2 while sensing signals on electrodes 24-1). Electrodes 24 may, if desired, have other shapes. The use of overlapping rows and columns of capacitive touch sensor electrodes is merely illustrative.

Figure 3:
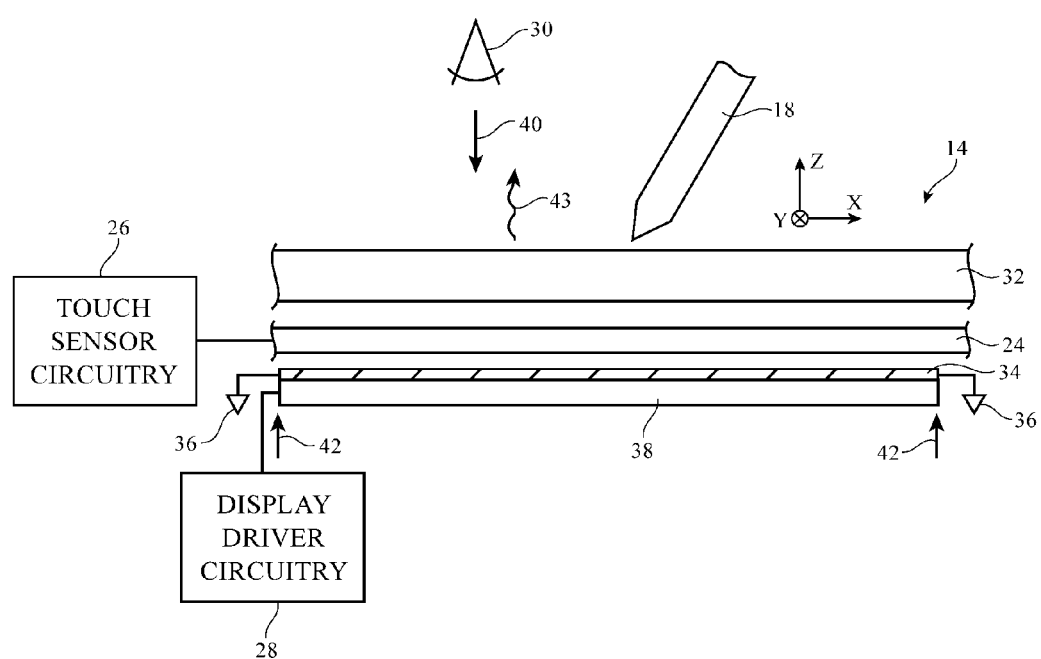
FIG. 3 is a cross-sectional side view of an illustrative touch sensor and display in accordance with an embodiment.

FIG. 3 is a cross-sectional side view of display 14. As shown in FIG. 3, display 14 may include display cover layer 32. Display cover layer 32 may be formed from transparent plastic, clear glass, a clear ceramic, a clear crystalline material such as sapphire, or other transparent material. Touch sensor electrodes 24 may be mounted under display cover layer 32. Touch sensor circuitry 26 may supply signals to touch sensor electrodes 24 and may process signals received from the touch sensor formed by touch sensor electrodes 24 to determine the position of the tip of stylus (pen) 18 on display 14 (i.e., the position of stylus 18 in dimensions X and Y). Display 14 may have display layers 38 (e.g., a display module or other display structures) that emit light 43 for images. User 30 may observe the images produced by display module 38 when viewing display 14 in direction 40. Touch sensor electrodes 24 may be transparent so that light 43 from display module 38 passes through touch sensor electrodes 24 and cover layer 32. Display module 38 may be a liquid crystal display module, an organic light-emitting diode display module, may be based on electrophoretic display structures, or may be based on any other suitable display layers.

Display module 38 may have signal lines that convey data and control signals produced by display driver circuitry 28 to an array of pixels in display module 38. These signals in display module 38 have the potential to create electromagnetic signal noise that affects the operation of the touch sensor. For example, data line signals can create noise in electrodes 24. To help shield touch sensor electrodes 24 from noise produced by display module 38, the upper surface of display module 38 (e.g., the upper surface of a color filter layer) or other layer in display 14 may be provided with a transparent shield layer such as shield layer 34. Shield layer 34 may be formed from a transparent conductive material such as indium tin oxide and may be grounded along its peripheral edges 42 (i.e., shield 34 may be shorted to ground 36 along the edges of display 14 and the touch sensor of display 14 that is formed by touch sensor electrodes 24). The presence of shield layer 34 may help prevent noise from signals such as data line signals in display module 38 from interfering with the operation of the touch sensor. There is some resistance associated with conductive shields formed from indium tin oxide shielding layers, so shielding effectiveness may be greatest near grounded edges 42.

Figure 4:
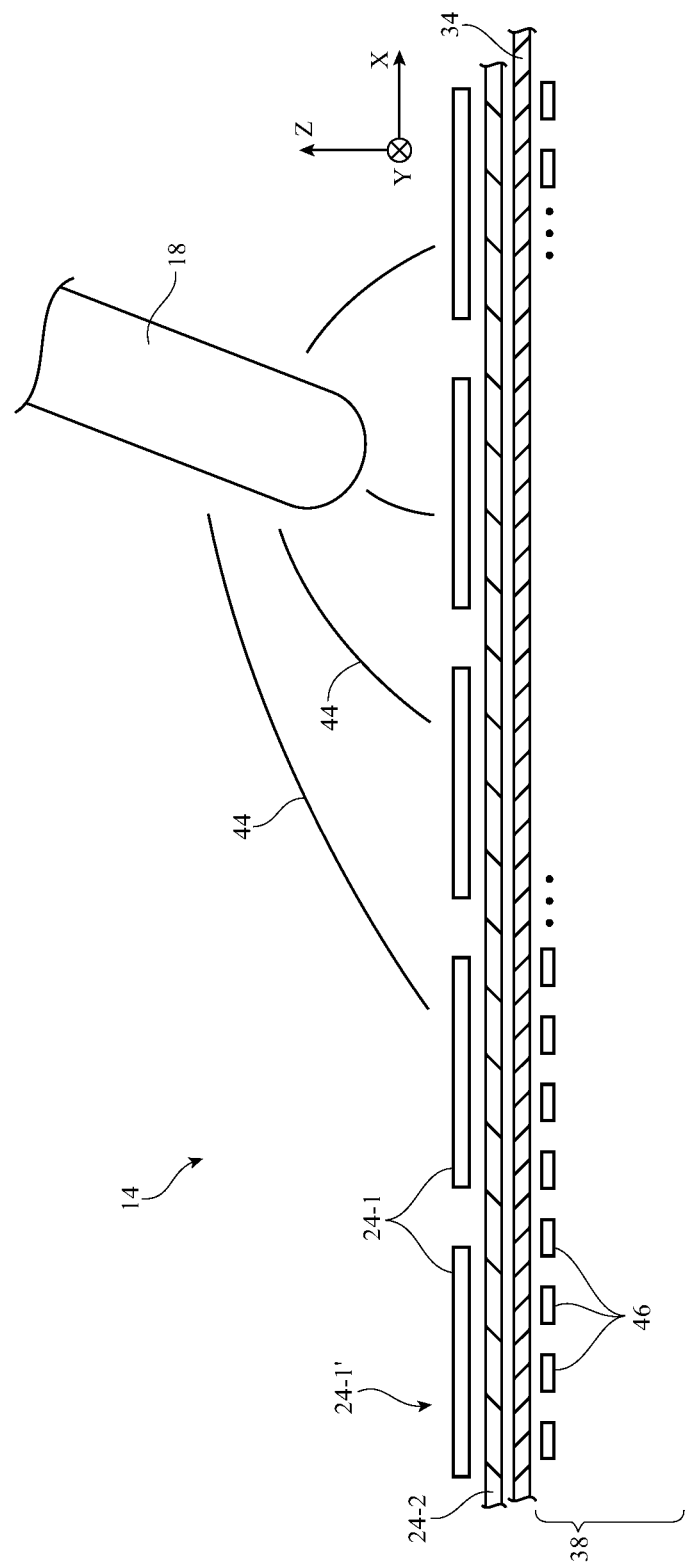
FIG. 4 is a cross-sectional side view of a portion of a touch sensor and display showing how touch sensor electrodes may interact with a stylus and may overlap signal lines such as data lines in a display in accordance with an embodiment.

FIG. 4 is a cross-sectional side view of an illustrative touch screen display to which touch input is being provided by stylus 18. As shown by electromagnetic field lines 44, electromagnetic signals from stylus 18 may be detected by one or more touch sensor electrodes 24-1 in the touch sensor of display 14. In the example of FIG. 4, signals 44 are being detected by four of electrodes 24-1 that are in the vicinity of the tip of stylus 18, but are not detected by other electrodes 24-1 (i.e., electrodes that are adjacent to the main four electrodes) because those electrodes are too far away from the tip. Touch sensor circuitry 26 can monitor the signals on electrodes 24 and can use the presence of signals 44 on certain electrodes 24 to determine the location of stylus 18 in lateral dimensions X and Y.

Touch sensor electrodes 24 of FIG. 4 may be formed on the upper and lower surfaces of a sheet of polymer or other dielectric support structure (i.e., touch sensor 22 may be use a two-sided electrode pattern). The upper electrodes (electrodes 24-1 in the example of FIG. 4) may run into and out of the page along the Y axis. The lower electrodes (electrodes 24-2) may run along the X axis. Display module 38 may have signal lines such as data lines 46 that emit noise. To help reduce spatial variations in the electromagnetic noise signals from data lines D that are coupled onto electrodes 24, the lower electrodes (i.e., electrodes 24-2) can be configured to run perpendicular to data lines 46. If, for example, data lines 46 run along axis Y, lower electrodes 24-2 may be formed from elongated strips of indium tin oxide or other conductive material that run along perpendicular dimension X.

Signals in the touch sensor that are associated with electrodes 24 that are not in the immediate vicinity of stylus 18 (e.g., electrode 24-1' in the example of FIG. 4) may not receive significant electrical signals 44 from stylus 18. Noise (e.g., electrical noise from data lines 46 or other signal sources in display module 38) may be produced uniformly across display 14 and may therefore be coupled onto both the electrodes that are in the vicinity of stylus 18 and electrodes that are not in the vicinity of stylus 18 (e.g., electrode 24-1'). To remove noise data from the electrodes that have stylus signals, noise signals can be measured using one or more electrodes such as electrode 24-1' that are not receiving significant stylus data and this noise data can be subtracted or otherwise removed from the stylus data on 24-1.

Figure 5:
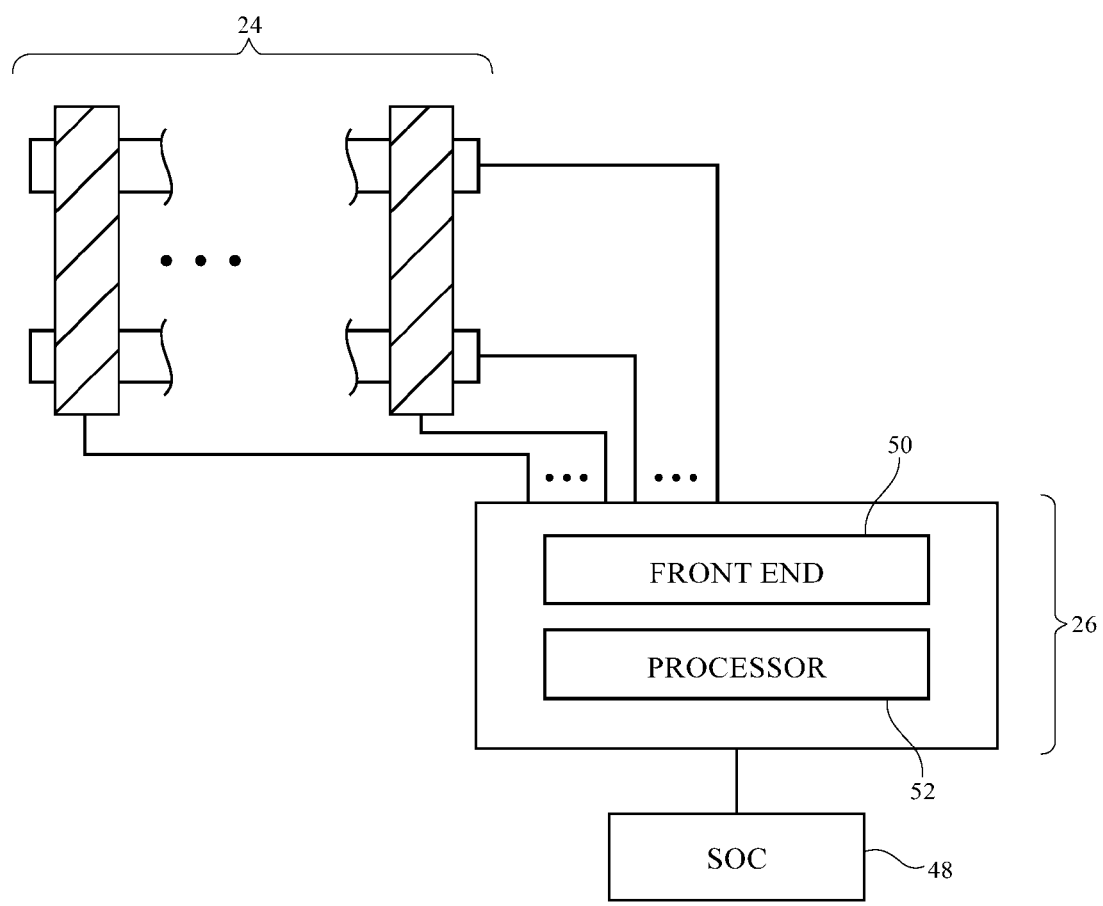
FIG. 5 is a diagram of a touch sensor and associated touch sensor circuitry in accordance with an embodiment.

Touch sensor signal processing can be performed using touch sensor circuitry 26. As shown in FIG. 5, touch sensor circuitry 26 may include front-end circuitry 50 and processor circuitry 52. Front-end circuitry 50 and processor circuitry 52 may be implemented on one or more integrated circuits and may be used to convert raw analog touch sensor data into digital position data. System-on-chip circuitry 48 or other control circuitry in device 10 may use position information from touch sensor circuitry 26 in controlling the operation of device 10.

Figure 6:
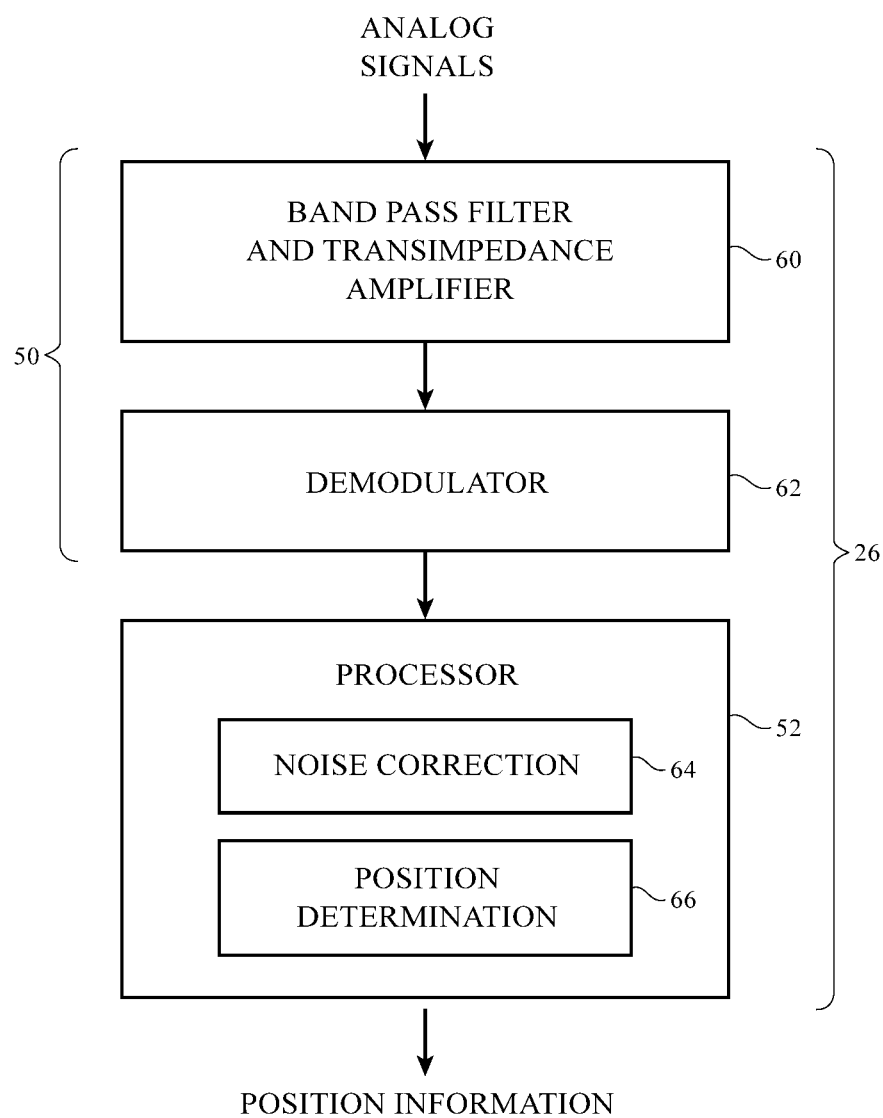
FIG. 6 is diagram of touch sensor circuitry in accordance with an embodiment.

FIG. 6 is a diagram showing how touch sensor circuitry 26 may process analog signals from capacitive touch sensor electrodes 24. As shown in FIG. 6, touch sensor circuitry 26 may include front-end circuitry 50 and processing circuitry 52. Front-end circuitry 50 may include band pass filter and transimpedance amplifier 60 and demodulator 62 for converting analog signals from electrodes 24 into digital electrode signals.

Stylus 18 may emit electromagnetic signals that are modulated using any suitable modulation scheme. For example, stylus 18 may use quadrature amplitude modulation. Demodulator 62 may include circuitry for demodulating the signals emitted by stylus 18. For example, demodulator 62 may be a quadrature demodulator that demodulates the signals from circuitry 60 and that produces corresponding in-phase (I) and quadrature phase (Q) signals as outputs. Circuitry 50 may be implemented in hardwired circuitry in touch sensor circuit 26.

If desired, stylus 18 may have multiple electrodes (e.g., two stylus electrodes, three or more stylus electrodes, etc.). Stylus electrodes in stylus 18 emit signals that are detected by touch sensor electrodes 24 and may therefore sometimes be referred to as drive electrodes or pen drive electrodes. Stylus 18 may have a tip electrode located at the tip of end 20 of stylus 18, may have a ring electrode (e.g., a drive electrode with the shape of a ring that encircles stylus 18), and/or other drive electrodes.

In configurations for stylus 18 with multiple pen drive electrodes, each of the drive electrodes may be modulated differently. For example, stylus 18 may have a pair of pen drive electrodes (e.g., tip and ring electrodes) and a first of the electrodes may be modulated using quadrature amplitude modulation at a first frequency whereas a second of the electrodes may be modulated using quadrature amplitude modulation at a second frequency that is different form the first frequency. Frequency division multiplexing or time division multiplexing may be used to drive the tip and ring electrodes simultaneously.

Front-end circuitry 50 can receive and process the signals from each of the stylus electrode separately, albeit simultaneously. If desired, information that is gathered in connection with one stylus electrode may be used in connection with the other stylus electrode. For example, information associated with operation of one stylus electrode may, if desired, be used when performing noise correction operations on signals associated with operation of another stylus electrode.

Processor 52 may perform noise correction operations (see, e.g., noise correction module 64) and position determination operations (see, e.g., position determination module 66). During noise correction operations, digital noise signals that are gathered using electrodes 24 and circuitry 50 may be removed from digital stylus signals that are gathered using electrodes 24 and circuitry 50. Noise correction operations may involve removing noise from digital stylus signals associated with one or more distinct stylus electrodes. Each stylus electrode may have a different profile and different noise correction factors may be used in connection with each stylus electrode. For example, the tip electrode may be associated with a 2-4 touch sensor electrode profile while the ring electrode may be associated with an 8-12 touch sensor electrode profile.

During position determination operations, the corrected noise-removed touch sensor signals (i.e., the touch sensor data from which display noise has been removed) may be processed to produce position data (i.e., X-Y coordinates specifying the location of the tip of stylus 18). Noise correction operations may, if desired, be performed in phase with the received signals (e.g., by performing subtraction operations and other correction operations on the I and Q signals from demodulator 62).

As described in connection with FIG. 4, display signal lines such as data lines 46 produce noise that is coupled into touch sensor electrodes 24. Display noise tends to be produced uniformly by all of lines 46. However, because shield 34 is grounded along edges 42, shielding effectiveness tends to be largest at the edges of display 14. As a result, the amount of noise that is coupled into electrodes 14 tends to increase near the center of display 68 and tends to be minimized near edges 42. Touch sensor electrode noise magnitude for an illustrative touch sensor has been plotted as a function of distance X across the surface of display 14 in the graph of FIG. 7. As shown by curve 68, noise is largest near the center of the touch sensor and display and is lowest near edges 42.

When stylus 18 is placed in the vicinity of electrodes 24, a set of N electrodes 24-1 will receive significant stylus signals from electrodes and circuitry in stylus 18. The value of N may vary as a function of touch sensor size, electrode size, and other parameters. As an example, the value of N may be 1, 2, 3, 4, or 5. The electrodes that receive significant stylus data from stylus 18 are sometimes referred to as "pen present" electrodes. Sets of electrodes that are adjacent to the pen present electrodes pick up primarily noise and may therefore sometimes be referred to as adjacent noise electrodes or noise electrodes. Because the amount of electrode noise varies as a function of distance X, the noise on the electrodes that are immediately to the left and right of the pen present electrodes is closest in magnitude to the noise on the pen present electrodes themselves. Accordingly, the amount of noise on the pen present electrodes can be accurately estimated (with minimal processing complexity) by gathering noise data from the electrodes to the immediate right and left of the pen present electrodes. As an example, noise data can be gathered for M electrodes that are located immediately to the left of the pen present electrodes and M electrodes that are located immediately to the right of the pen present electrodes. The value of M may vary as a function of touch sensor size, electrode size, and other parameters. As an example, the value of M may be 2, 3, or 4 (so that the total number of noise electrodes 2 M is 4, 6, or 8).

In a typical noise correction scenario, pen present data can be gathered from the pen present electrodes and noise data can be gathered from electrodes adjacent to the pen present electrodes. Processor 52 (i.e., noise correction module 64 of FIG. 6) produces pen present electrode data from which the noise data has been removed (sometimes referred to as noise-removed pen present data or corrected stylus data). The corrected stylus data can then be used to produce position information.

When the pen present electrodes are located in the center of the display, symmetrical sets of the noise electrodes can be located to the left and right of the pen present electrodes. In situations in which the pen present electrodes are near to the edges 42 of display 14, the noise electrodes at the display will not all be available. To compensate for the loss of edge-side noise electrodes, the number of noise electrodes that are used on the inner side of the pen present electrodes may be expanded. This helps ensure that a sufficient amount of noise data is sampled.

Electrode sampling configurations of the type that may be used for touch sensor electrodes 24 of display 14 are shown in FIGS. 8, 9, 10, 11, 12, and 13.

Figure 8:
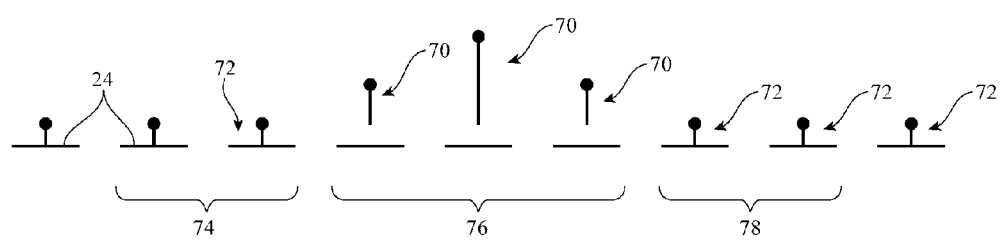
FIG. 8 is a diagram showing sets of sensor electrodes that may be used for measuring stylus signals and noise in a configuration in which the stylus is not near the edge of a touch sensor in accordance with an embodiment.
Figure 9:
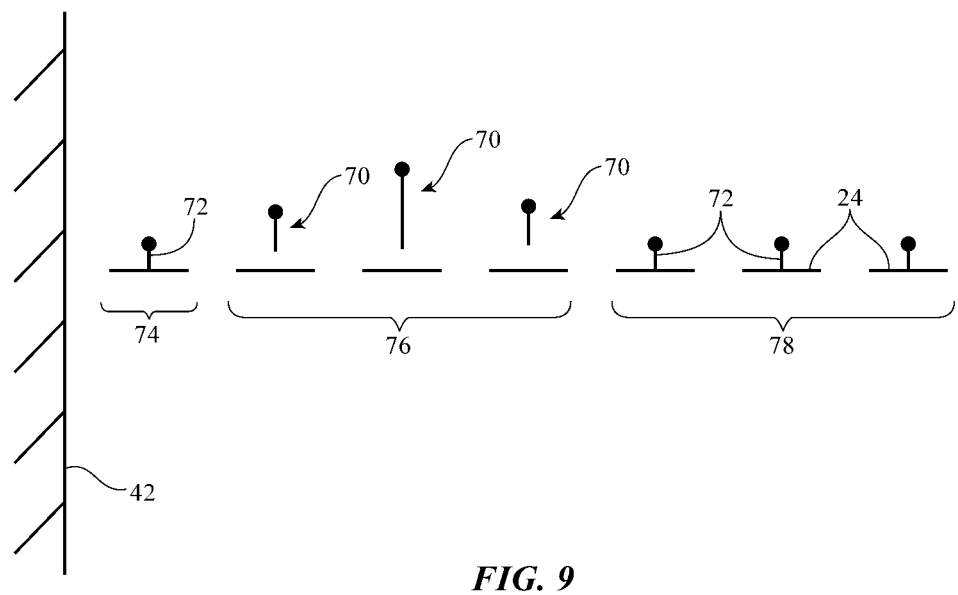
FIG. 9 is a diagram showing sets of sensor electrodes that may be used for measuring stylus signals and noise in a configuration in which the stylus is within one electrode of the edge of the touch sensor in accordance with an embodiment.
Figure 10:
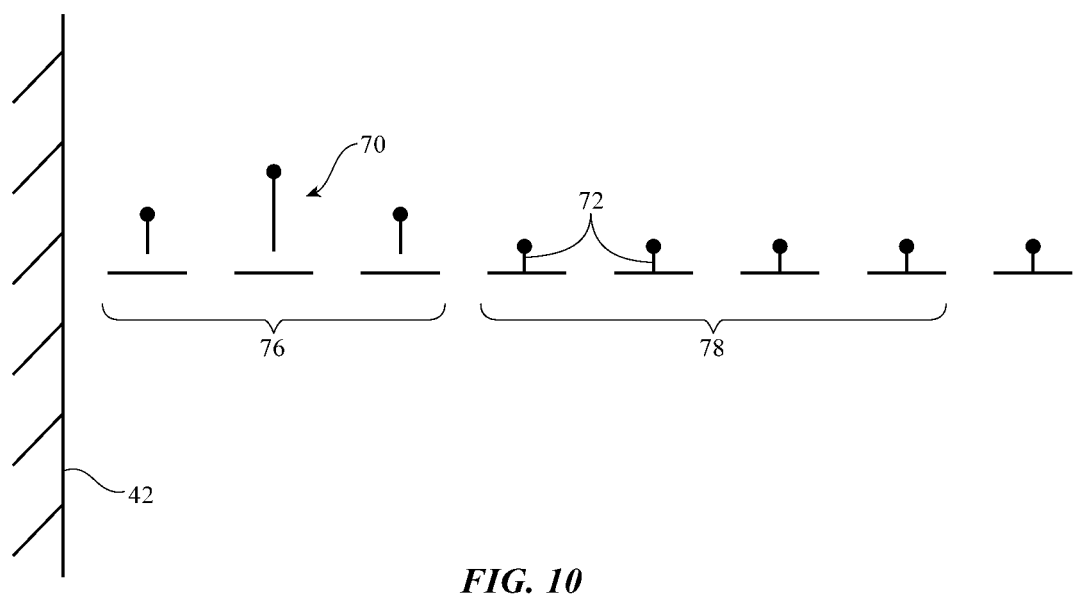
FIG. 10 is a diagram showing sets of sensor electrodes that may be used for measuring stylus signals and noise in a configuration in which the stylus is adjacent to the edge of the touch sensor in accordance with an embodiment.

FIGS. 8, 9, and 10 show how pen present and noise signals can be gathered in a configuration in which pen present data is collected from three electrodes. FIG. 8 shows how data may be measured in a configuration in which pen present electrodes 76 are located in the center of display 14. In this type of situation, noise sampling electrodes 74 and 78 are not located at the edge of display 14 and are therefore not pinched off by the presence of the display (and touch sensor) edge 42. Accordingly, pen present data 70 can be sampled from a set of electrodes such as electrodes 76 among electrodes 24 and noise samples 72 can be taken from noise sample electrodes 74 (on the left of pen present electrodes 76) and from noise sample electrodes 78 (on the right of pen present electrodes 76). There are three pen present electrodes 76, two left noise electrodes 74, and two right noise electrodes 78 in the example of FIG. 8, but other numbers of pen present electrodes and/or noise electrodes may be used to collect data if desired. For example, there may be only one pen present electrode, may be only two pen present electrodes (i.e., more than one and fewer than three), may be three or more pen present electrodes, may be only three pen present electrodes, may be three or four pen present electrodes, may be four or more pen present electrodes, etc.

Touch sensor circuitry 26 can identify which of electrodes 24 correspond to the presence of active stylus data (i.e., which electrodes are the pen present electrodes) by identifying which electrodes have the largest signal strengths, by comparing signal strengths to threshold values, and/or other signal processing techniques. Once the electrodes with the largest signal strengths have been identified, the position of the pen present electrodes relative to edges 42 may be determined. When the stylus is near the edge of display 14, the pattern of noise electrodes that is used in gathering noise data 72 can be adjusted to accommodate the display edge.

In the example of FIG. 8, pen present electrodes 76 are located in the center of display 14, so the noise electrodes from which noise signals 72 are measured are equally spaced about pen present electrodes 76. Two electrodes are located in left-side noise electrodes 74 and two electrodes are located in right-side noise electrodes 78. In the example of FIG. 9, stylus 18 is located near display edge 42, so that pen present electrodes 76 are separated from edge 42 of display 14 by only a single electrode 24 (i.e., left side noise electrodes 74 contain only a single electrode). As a result, the number of right-side noise electrodes 78 that are being used has been expanded from two electrodes to three electrodes. In the example of FIG. 10, stylus 18 is located even nearer display edge 42, so that no noise electrodes 74 are interposed between pen present electrodes 76 and edge 42. In this scenario, there are four right-side noise electrodes 78. The expansion of the number of right-side noise electrodes as the left-side electrodes become pinched off helps to avoid situations in which too little noise data is being collected. Both left-edge pinch-off and right-edge pinch-off conditions for electrodes 24-1 may be treated in the same way. The use of a left-hand pinch-off condition in the example of FIGS. 8, 9, and 10 is merely illustrative. Because there are two electrodes 74 and two electrodes 78 in the arrangement of FIG. 8, configurations of the type shown FIG. 8 in which none of the noise electrodes are pinched off may sometimes be referred to as 2/2 configurations. There is one electrode 74 and three electrodes 78 in the configuration of FIG. 9, so the configuration of FIG. 9 may be referred to as a 1/3 configuration. FIG. 10 is an example of a 0/4 configuration (0 electrodes 74 and 4 electrodes 78 are being used for noise data collection).

Figure 11:
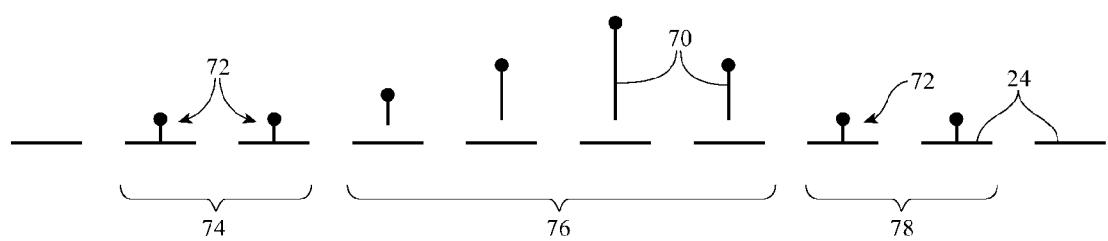
FIG. 11 is a diagram showing sets of sensor electrodes that may be used for measuring stylus signals and noise in another configuration in which the stylus is not near the edge of a touch sensor in accordance with an embodiment.
Figure 12:
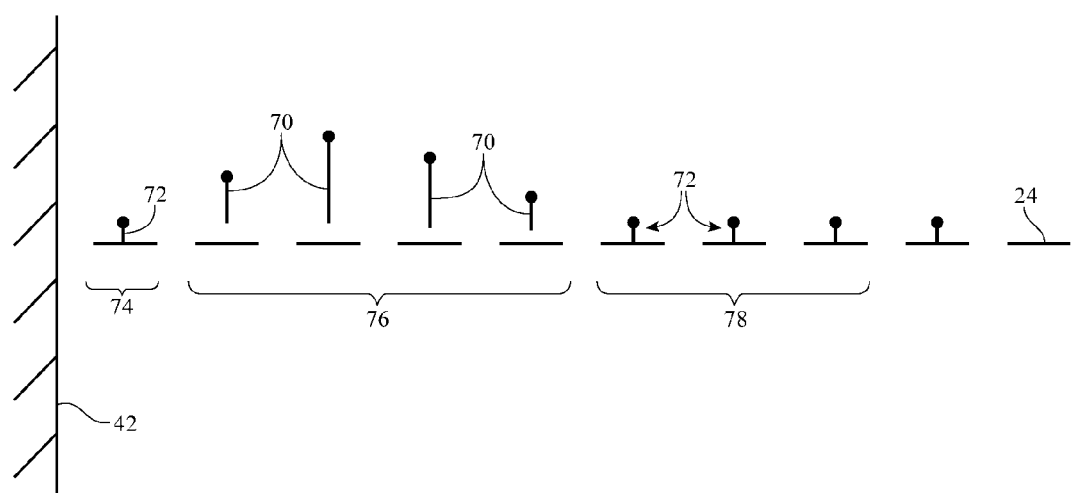
FIG. 12 is a diagram showing sets of sensor electrodes that may be used for measuring stylus signals and noise in a configuration of the type shown in FIG. 11 where the stylus is within one electrode of the edge of the touch sensor in accordance with an embodiment.
Figure 13:
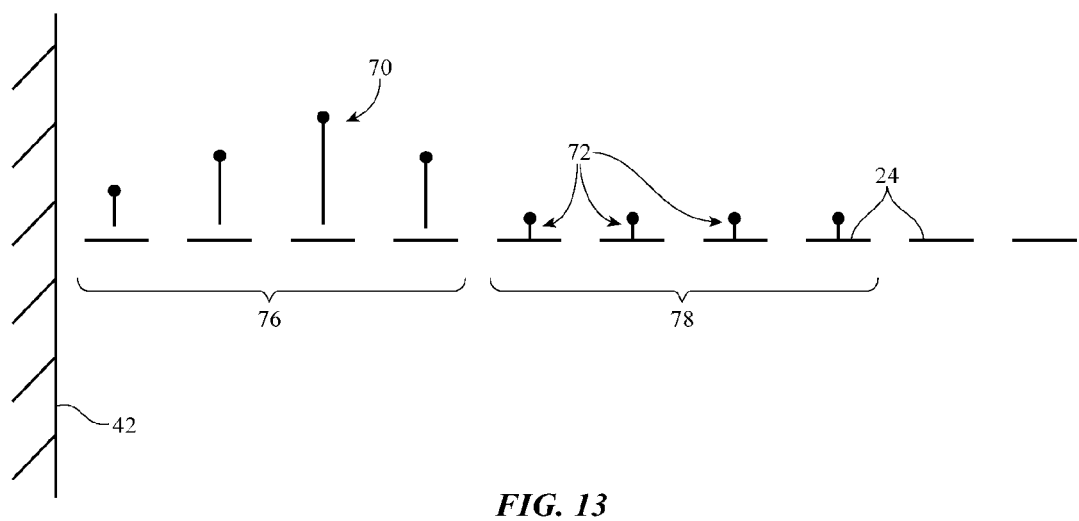
FIG. 13 is a diagram showing sets of sensor electrodes that may be used for measuring stylus signals and noise in a configuration of the type shown in FIGS. 11 and 12 where the stylus is adjacent to the edge of the touch sensor in accordance with an embodiment.

FIGS. 11, 12, and 13 show how pen present data and noise data can be gathered in a configuration in which pen present data is collected from four electrodes. FIG. 11 shows how data may be measured in a configuration in which pen present electrodes 76 are located in the center of display 14 (i.e., a 2/2 configuration). FIG. 12 shows an illustrative 1/3 configuration with four electrodes 76, whereas FIG. 13 shows and illustrative 0/4 configuration with four electrodes 78. In general, any suitable number N of pen present electrodes and any suitable number 2 M of noise electrodes may be used. For example, there may be only one pen present electrode (N may be one), may be only two pen present electrodes (i.e., N may be two), may be three or more pen present electrodes, may be only three pen present electrodes, may be three or four pen present electrodes, may be four or more pen present electrodes, etc. The number 2 M may be two or more, four or more, six or more, seven or more, eight or more, nine or more, ten or more, 5-15, less than 15, more than two, less than eight, or any other suitable number. The arrangements of FIGS. 8, 9 10, 11, 12, and 13 are merely illustrative.

Figure 7:
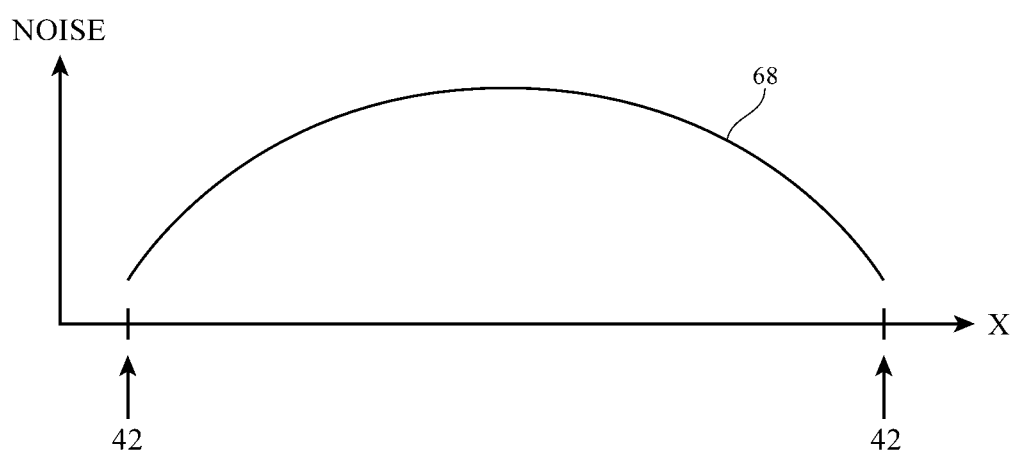
FIG. 7 is a graph showing how touch sensor noise may vary as a function of distance across a touch sensor in accordance with an embodiment.

As shown by curve 68 in FIG. 7, noise decreases in magnitude near edges 42. The downward slope of noise curve 68 creates larger noise signals on the inner side of pen present pixels 76 than on the outer side of pen present pixels 76 when stylus 18 is near edge 42. As a result, the noise measured from the noise electrodes in the 1/3 scenario and in the 0/4 scenario will be larger than actual noise on the pen present electrodes, because the noise samples are effectively being spatially weighted towards the noisier side of the pen present electrodes. This can be accommodating by using a noise scaling factor K when removing noise from pen present data when stylus 18 is near edges 42.

FIG. 14 is a look-up table showing how noise scaling factor K may be adjusted by touch sensor circuitry 26 as a function of noise electrode configuration. In unpinched configurations (i.e., 2/2 configurations), there is no scaling (i.e., K is one), because noise signals 72 for both electrodes 74 and 78 are relatively equal (and are equal to the noise signals on electrodes 76). In slightly pinched-off configurations (e.g., 1/3 configurations on both the left and right edges), the value of K may be decreased to 0.75 or other suitable value. In completely pinched-off configurations (e.g., 0/4 configurations on both the left and right edges), the value of K may be decreased further to 0.6 or other suitable value. Other types of scaling function may be used by touch sensor circuitry 26 if desired. The use of a look-up table to store values of a linear noise data scaling parameter that varies as a function of distance between stylus 18 and display edge 42 is merely illustrative.

Figure 15:
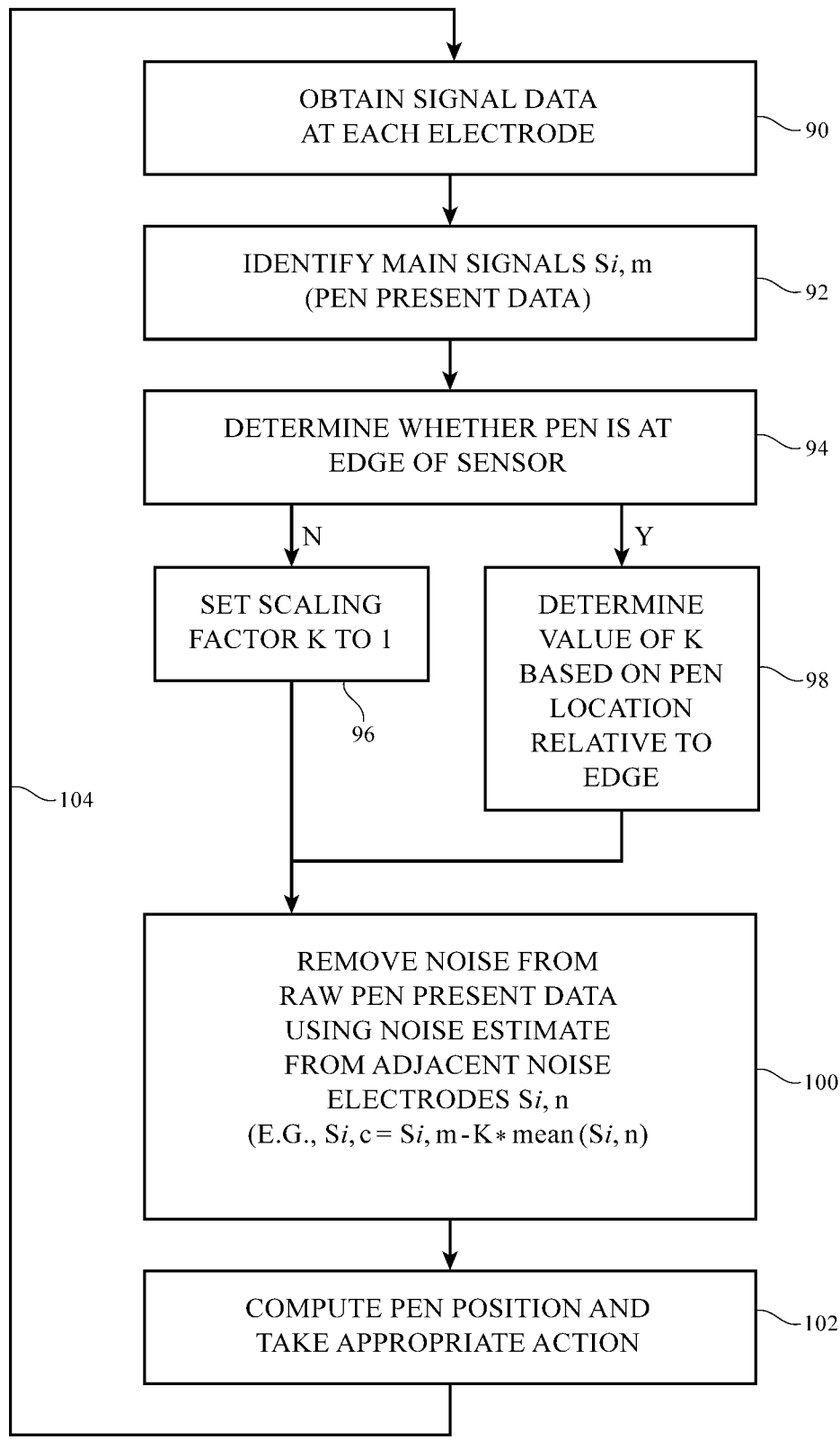
FIG. 15 is a flow chart of illustrative steps involved in processing stylus data in accordance with an embodiment.

A flow chart of illustrative steps involved in processing touch sensor data (e.g., touch sensor data gathered from touch sensor electrodes 24 in display 14) is shown in FIG. 15.

At step 90, touch sensor circuitry 26 (e.g., bandpass filter and transimpedance amplifier 60 and demodulator 62) may gather signal data from electrodes 24.

Steps 92, 94, 96, 98, and 100 may be performed using noise correction module 64 (FIG. 6).

At step 92, touch sensor circuitry 26 may identify the main signals on sensors 24. In particular, touch sensor circuitry 26 may identify the pen present signals 70 on pen present electrodes 76.

At step 94, touch sensor circuitry 26 may determine whether stylus 18 is close to display (and sensor) edge 42, so that noise electrodes are being pinched off. In configurations in which stylus 18 is located near the center of display 14, the noise electrodes will not be pinched off and scaling factor K may be set to 1 at step 96 (i.e., scaling is disabled). In configurations in which stylus 18 is near edge 42, the value of K may be determined based on how far pen present electrodes 76 are from edge 42 (step 98). For example, the look-up table of FIG. 14 may be used to determine K in response to determining whether the noise sampling electrodes are in a 1/3 or 0/4 configuration (in a four noise electrode example).

After determining K, touch sensor circuitry 26 may remove noise from the raw pen present signals 70 gathered using pen present electrodes 76 (step 100). During the operations of step 100, noise correction module 64 of processor 52 may compute the average noise signal on the noise electrodes (i.e., the value of mean($S_{i,n}$), where signals $S_{i,n}$ represent sampled noise data—see, e.g., signals 72 of FIGS. 8, 9, 10, 11, 12, and 13). Scaling factor K may be multiplied against this value to scale the noise appropriately (i.e., to scale the noise data based on the distance of pen present electrodes 76 from edge 42). Noise correction module 64 may then compute noise-removed pen present signal values (i.e., signals $S_{i,c}$) by subtracting {K mean($S_{i,n}$)} from raw pen present signals $S_{i,m}$ (signals 70). If desired, noise correction operations may be performed in phase with the received signals (e.g., by performing subtraction operations and other correction operations in phase with raw pen present signals such as I and Q signals from demodulator 62).

Other types of noise removal process may be used to remove noise from the pen present data on the pen present electrodes. The use of subtraction to remove a scaled version of the average value of the noise measured with 2 M adjacent noise electrodes is merely illustrative.

At step 102, position determination module 66 may determine the position of stylus 18 (i.e., stylus coordinates in dimensions X and Y). Processing may then loop back to step 90, as shown by line 104. During the operations of step 102, control circuitry such as system-on-chip processor 48 may take suitable action based on the stylus coordinates. For example, control circuitry in device 10 may draw a line on display 14 using display driver circuitry 28, may determine whether a user has made a selection of an on-screen option and respond appropriately, or may take other suitable action in connection with an operating system, application program, or other code running on device 10.

The foregoing is merely illustrative and various modifications can be made by those skilled in the art without departing from the scope and spirit of the described embodiments. The foregoing embodiments may be implemented individually or in any combination.

What is claimed is:

1. Apparatus that is responsive to input from a stylus, comprising:
   a touch sensor having edges and having a plurality of electrodes; and
   touch sensor circuitry that processes signals from the plurality of electrodes, wherein the touch sensor circuitry obtains signal data from the plurality of electrodes including pen present data from pen present electrodes where the stylus is located on the touch sensor and noise data from noise electrodes adjacent to the pen present electrodes, wherein the touch sensor circuitry includes a processor that removes the noise data from the pen present data to produce noise-removed pen present data, wherein the noise electrodes include at least four electrodes adjacent to the pen present electrodes, and wherein the processor includes a noise correction module that removes the noise data from the pen present data by computing a mean of the noise data on the noise electrodes.

2. The apparatus defined in claim 1 wherein the touch sensor circuitry is configured to compute position data for the stylus based on the noise-removed pen present data.

3. The apparatus defined in claim 2 wherein the touch sensor circuitry includes front-end circuitry that obtains the signal data from the plurality of electrodes.

4. The apparatus defined in claim 3 wherein the pen present electrodes are formed from a set of at least three electrodes among the plurality of electrodes.

5. The apparatus defined in claim 4 wherein the noise correction module is configured to subtract a value equal to the mean of the noise data multiplied by a noise data scaling factor from the pen present data to produce the noise-removed pen present data.

6. The apparatus defined in claim 5 further comprising:
a display, wherein the touch sensor overlaps the display.

7. The apparatus defined in claim 6 wherein the plurality of electrodes includes first elongated transparent electrodes that extend along a first dimension, the touch sensor further comprising second elongated transparent electrodes that extend along a second dimension that is perpendicular to the first dimension.

8. The apparatus defined in claim 7 wherein the display has a plurality of data lines that extend along the first dimension and wherein the second elongated transparent electrodes are interposed between the first elongated transparent electrodes and the plurality of data lines.

9. The apparatus defined in claim 8 wherein the noise correction module is configured to select a value for the noise data scaling factor based on how far the pen present electrodes are located from one of the edges.

10. A touch sensor display that receives input from a stylus, comprising:
display layers that produce images, wherein the display layers include data lines and have edges;
a conductive transparent shield layer that overlaps the display layers and that is grounded at the edges;
touch sensor electrodes on the display layers that receive noise from the data lines; and
touch sensor circuitry that processes signals from the electrodes, wherein the touch sensor circuitry obtains pen present data from pen present electrodes associated with presence of the stylus and noise data from noise electrodes adjacent to the pen present electrodes and that removes the noise data from the pen present data, wherein the pen present electrodes have first and second opposing sides, wherein there are at least two adjacent noise electrodes on the first side of the pen present electrodes when the pen present electrodes are located away from the edges of the display layers, and wherein there are at least two adjacent noise electrodes on the second side of the pen present electrodes when the pen present electrodes are located away from the edges of the display layers.

11. The touch sensor display defined in claim 10 wherein there are three pen present electrodes.

12. The touch sensor display defined in claim 10 wherein the touch sensor circuitry removes the noise data based at least partly on how far the pen present electrodes are from the edges.

13. The touch sensor display defined in claim 12 wherein the touch sensor electrodes include first elongated transparent electrodes that extend along a first dimension and second elongated transparent electrodes that extend along a second dimension that is perpendicular to the first dimension, wherein the data lines extend along the first dimension, and wherein the second elongated transparent electrodes are interposed between the first elongated transparent electrodes and the data lines.

14. The touch sensor display defined in claim 10 wherein there are two pen present electrodes.

15. The touch sensor display defined in claim 10, wherein there are less than two noise electrodes on the first side of the pen present electrodes when the pen present electrodes are located near the edges of the display layers, and wherein there are at least three noise electrodes on the second side of the pen present electrodes when the pen present electrodes are located near the edges of the display layers.

16. A method of determining where a stylus is located on a touch sensor, comprising:
with front end circuitry in a touch sensor circuit, measuring pen present data on at least one pen present touch sensor electrode associated with a presence of the stylus on the touch sensor and measuring noise data on first and second sets of touch sensor noise electrodes that are adjacent to the at least one pen present touch sensor electrode and that are located on opposing sides of the at least one pen present touch sensor electrode, wherein the first and second sets of adjacent touch sensor noise electrodes each include fewer than four touch sensor noise electrodes; and
with the touch sensor circuit, removing noise from the pen present data based on the measured noise data.

17. The method defined in claim 16 wherein removing the noise comprises removing the noise with a noise correction module in the touch sensor circuit based at least partly on how far the at least one pen present touch sensor electrode is from edges of the touch sensor.

18. The method defined in claim 17 wherein removing the noise comprises applying a scaling factor to the measured noise data based on how far the at least one pen present touch sensor electrode is from the edges of the touch sensor.

19. The method defined in claim 16 wherein removing the noise comprises removing the noise in phase with the pen present data.

20. The method defined in claim 16 wherein the at least one pen present touch sensor electrode comprises more than one pen present touch sensor electrode and fewer than three pen present touch sensor electrodes.

21. The method defined in claim 16, wherein the first set of adjacent touch sensor noise electrodes includes two touch sensor noise electrodes when the pen present electrodes are located a first distance from an edge of the touch sensor, wherein the first set of adjacent touch sensor noise electrodes includes one touch sensor noise electrode when the pen present electrodes are located a second distance from the edge of the touch sensor, wherein the first set of adjacent touch sensor noise electrodes includes zero touch sensor noise electrodes when the pen present electrodes are located a third distance from the edge of the touch sensor, wherein the first distance is greater than the second distance, and wherein the second distance is greater than the third distance.

22. The method defined in claim 21, wherein the second set of adjacent touch sensor noise electrodes includes two touch sensor noise electrodes when the first set of adjacent touch sensor noise electrodes includes two touch sensor noise electrodes, wherein the second set of adjacent touch sensor noise electrodes includes three touch sensor noise electrodes when the first set of adjacent touch sensor noise electrodes includes one touch sensor noise electrode, and wherein the second set of adjacent touch sensor noise electrodes includes four touch sensor noise electrodes when the first set of adjacent touch sensor noise electrodes includes zero touch sensor noise electrodes.

\* \* \* \* \*